(12) United States Patent
Ding et al.

(10) Patent No.: US 10,222,886 B2
(45) Date of Patent: Mar. 5, 2019

(54) DISPLAY DEVICE, DRIVING METHOD THEREOF AND MANUFACTURING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Haisheng Wang, Beijing (CN); Yingming Liu, Beijing (CN); Weijie Zhao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 197 days.

(21) Appl. No.: 15/103,980

(22) PCT Filed: Dec. 17, 2015

(86) PCT No.: PCT/CN2015/097680
§ 371 (c)(1),
(2) Date: Jun. 13, 2016

(87) PCT Pub. No.: WO2016/197576
PCT Pub. Date: Dec. 15, 2016

(65) Prior Publication Data
US 2017/0115783 A1 Apr. 27, 2017

(30) Foreign Application Priority Data
Jun. 9, 2015 (CN) .......................... 2015 1 0313988

(51) Int. Cl.
*G06F 3/041* (2006.01)
*G02B 27/22* (2018.01)
(Continued)

(52) U.S. Cl.
CPC ....... *G06F 3/0412* (2013.01); *G02B 27/2214* (2013.01); *G02B 27/26* (2013.01);
(Continued)

(58) Field of Classification Search
CPC ...... G06F 3/041; G06F 3/0412; G06F 3/0416; G06F 2203/04103; G09G 3/003;
(Continued)

(56) References Cited

U.S. PATENT DOCUMENTS 8,687,135 B2 * 4/2014 Son ..................... G02F 1/13338
349/40
9,195,081 B2 * 11/2015 Yang ....................... G06F 3/044
(Continued)

FOREIGN PATENT DOCUMENTS

CN 202548493 U 11/2012
CN 103698926 A 4/2014
(Continued)

OTHER PUBLICATIONS

CN First Office Action, Application No. 201510313988.1, dated Feb. 28, 2017, 13 pps, with English Translation.
(Continued)

*Primary Examiner* — Jason M Mandeville
(74) *Attorney, Agent, or Firm* — Armstrong Teasdale LLP

(57) ABSTRACT

The present disclosure provides a display device, a driving method thereof and a manufacturing method thereof. The display device includes a display panel and a 3D raster module disposed on a light emergent side of the display panel. The 3D raster module includes a 3D common electrode layer, a 3D raster electrode layer, an electrically (Continued)

controlled material layer, and a touch control reception electrode layer. The 3D raster electrode layer includes a plurality of raster electrodes, at least a part of which is reused as touch control transmitting electrodes and is connected with touch control transmitting electrode wires. The touch control reception electrode layer includes a plurality of reception electrodes and a plurality of touch control signal reception wires connected with the reception electrodes. A length direction of the reception electrodes in the touch control reception electrode layer is perpendicular to that of the raster electrodes.

17 Claims, 2 Drawing Sheets

(51) Int. Cl.
*G02B 27/26* (2006.01)
*G02F 1/1333* (2006.01)
*G02F 1/1335* (2006.01)
*G02F 1/1343* (2006.01)
*G09G 3/00* (2006.01)
*G02F 1/1347* (2006.01)
*G06F 3/044* (2006.01)

(52) U.S. Cl.
CPC ...... *G02F 1/13338* (2013.01); *G02F 1/13471* (2013.01); *G02F 1/133528* (2013.01); *G02F 1/134309* (2013.01); *G06F 3/044* (2013.01); *G06F 3/0416* (2013.01); *G09G 3/003* (2013.01); *G06F 2203/04103* (2013.01)

(58) Field of Classification Search
CPC .... G02B 27/22; G02B 27/2214; G02B 27/26; G02F 1/13338; G02F 1/133528; G02F 1/134309

USPC .......................................... 345/173, 214, 87
See application file for complete search history.

(56) References Cited

U.S. PATENT DOCUMENTS

| 9,261,993 B2* | 2/2016 | Yang ................. G06F 3/041 |
| 2013/0155059 A1* | 6/2013 | Wang ................. G06F 3/041 345/419 |
| 2013/0215076 A1* | 8/2013 | Lee .................. G09G 3/003 345/174 |
| 2013/0241869 A1* | 9/2013 | Kida ................. G06F 3/044 345/174 |
| 2013/0300705 A1* | 11/2013 | Goo ................ G02F 1/13338 345/174 |
| 2014/0111470 A1 | 4/2014 | Wu et al. |
| 2014/0362314 A1* | 12/2014 | Guo ................ G02B 27/2214 349/15 |
| 2015/0130751 A1 | 5/2015 | Teraguchi |
| 2015/0168761 A1* | 6/2015 | Chang ............. G02F 1/13338 349/12 |
| 2016/0077368 A1* | 3/2016 | Kim ............... G02F 1/13338 349/12 |

FOREIGN PATENT DOCUMENTS

| CN | 103777391 A | 5/2014 |
| CN | 103941445 A | 7/2014 |
| CN | 104849886 A | 8/2015 |

OTHER PUBLICATIONS

PCT International Written Opinion, Application No. PCT/CN2015/097680, dated Mar. 22, 2016, 10 pps, with English Translation.

* cited by examiner

DISPLAY DEVICE, DRIVING METHOD THEREOF AND MANUFACTURING METHOD THEREOF

CROSS REFERENCE TO RELATED APPLICATIONS

This application is a National Stage Entry of PCT/CN2015/097680 filed Dec. 17, 2015, which claims the benefit and priority of Chinese Patent Application No. 201510313988.1 filed Jun. 9, 2015, both of which are incorporated herein by reference in their entirety.

BACKGROUND

The present disclosure relates to the field of display technologies, and more particularly, to a display device, a driving method thereof and a manufacturing method thereof.

Existing touch control display devices include in cell touch control display devices and on cell touch control display devices, wherein an in cell touch control display device generally reuses electrodes in a display panel as touch control transmitting electrodes for touch control. In this way, a whole cell thickness of a display device is reduced, and a separate step for manufacturing touch control transmitting electrodes is reduced. Therefore, the in cell touch control display device gradually becomes the mainstream.

However, existing in cell touch control display technologies are difficult to be directly used in 2D/3D convertible display devices, which are increasingly popular with consumers. The 2D/3D convertible display devices can achieve switching between a 2D display mode and a 3D display mode. In a mainstream 2D/3D convertible display device, a variable 3D raster module capable of switching between a transparent state and a non-transparent state is manufactured on an outer side of a display panel, thereby achieve switching between 2D and 3D. Generally, such a variable 3D raster module needs using electrodes to achieve switching between a transparent state and a non-transparent state. However, electrodes in the variable 3D raster module are positioned on a light emergent side of the display panel and have a shielding effect on electrodes in the display panel. Therefore, generally it is unable to use the electrodes in the display panel as touch control transmitting electrodes, and it is unable to achieve an in cell touch control structure. In an existing 2D/3D convertible touch control display device, touch control transmitting electrodes are separately manufactured on the light emergent side of the foregoing 3D raster module, the manufacturing difficulty is greater and the cell thickness is larger.

BRIEF DESCRIPTION

Embodiments of the present disclosure provide a display device, a driving method thereof and a manufacturing method thereof.

In one aspect, a display device is provided. The display device includes a display panel, and a 3D raster module disposed on a light emergent side of the display panel. The 3D raster module includes a 3D common electrode layer, a 3D raster electrode layer disposed on a light emergent side of the 3D common electrode layer, an electrically controlled material layer disposed between the 3D common electrode layer and the 3D raster electrode layer, and a touch control reception electrode layer disposed on a light emergent side of the 3D raster electrode layer. The 3D raster module is configured to function as a 3D raster when an electric field is generated between the 3D common electrode layer and the 3D raster electrode layer, and to be transparent when no electric field is generated between the 3D common electrode layer and the 3D raster electrode layer. The 3D raster electrode layer includes a plurality of raster electrodes, and at least a part of the plurality of raster electrodes is reused as touch control transmitting electrodes and is connected with touch control transmitting electrode wires. The touch control reception electrode layer includes a plurality of reception electrodes and a plurality of touch control signal reception wires connected with the reception electrodes, and a length direction of the reception electrodes in the touch control reception electrode layer is perpendicular to a length direction of the raster electrodes in the 3D raster electrode layer.

In the embodiments of the present disclosure, an electrically controlled material constituting the electrically controlled material layer is a liquid crystal material, the 3D raster module further includes a polarizer disposed on the light emergent side of the 3D raster electrode layer, the liquid crystal material is adapted to allow the light rays emitted from the display panel not to pass through the polarizer in the case of the electric field, and to allow the light rays emitted from the display panel to pass through the polarizer in the case of no electric field.

In the embodiments of the present disclosure, the plurality of raster electrodes are divided into at least one raster electrode group, the raster electrode group includes at least one raster electrode, and the at least one raster electrode in the raster electrode group is connected with the same touch control transmitting electrode wire.

In the embodiments of the present disclosure, the 3D common electrode layer includes a plurality of common electrodes and a plurality of 3D common electrode wires connected with the common electrodes, and the raster electrode group and the corresponding common electrode constitute an electrode pair for generating an electric field.

In the embodiments of the present disclosure, the reception electrode includes a plurality of reception sub-electrodes connected with the same touch control signal reception wire, and the reception sub-electrodes are in parallel with the raster electrodes and are arranged alternately with the raster electrodes.

In the embodiments of the present disclosure, the 3D variable raster module further includes a transparent cover plate, and the 3D raster electrode layer and the touch control reception electrode layer are formed on the transparent cover plate through a patterning process.

According to another aspect, a method for driving the foregoing display device is provided. The method includes generating an electric field between raster electrodes and common electrodes for 3D display, by controlling voltages applied to raster electrode wires and 3D common electrode wires, and applying touch control transmission signals in sequence to each touch control transmitting electrode wire to conduct a touch control detection.

In the embodiments of the present disclosure, the method further includes, for each of the touch control transmitting electrode wires, applying the touch control transmission signal to the 3D common electrode wire connected with the common electrode corresponding to the raster electrode group connected with each of the touch control transmitting electrode wires, at the same time when the touch control transmission signal is applied to the touch control transmitting electrode wire.

In the embodiments of the present disclosure, the method further includes, generating no electric field between the raster electrodes and the common electrodes for 2D display, by controlling the voltages applied to the raster electrode wires and the 3D common electrode wires.

According to still another aspect, a method for manufacturing the foregoing display device is provided. The method includes providing a display panel, and forming a 3D raster module on a light emergent side of the display panel. The 3D raster module includes a 3D common electrode layer, a 3D raster electrode layer disposed on a light emergent side of the 3D common electrode layer, an electrically controlled material layer disposed between the 3D common electrode layer and the 3D raster electrode layer, and a touch control reception electrode layer disposed on a light emergent side of the 3D raster electrode layer. The 3D raster module is configured to function as a 3D raster when an electric field is generated between the 3D common electrode layer and the 3D raster electrode layer, and to be transparent when no electric field is generated between the 3D common electrode layer and the 3D raster electrode layer. The 3D raster electrode layer includes a plurality of raster electrodes, and at least a part of the plurality of raster electrodes is reused as touch control transmitting electrodes and is connected with touch control transmitting electrode wires. The touch control reception electrode layer includes a plurality of reception electrodes and a plurality of touch control signal reception wires connected with the reception electrodes, and a length direction of the reception electrodes in the touch control reception electrode layer is perpendicular to a length direction of the raster electrodes in the 3D raster electrode layer.

In the display device provided by the embodiments of the present disclosure, raster electrodes in the variable 3D raster module may be reused as touch control transmitting electrodes, so it is unnecessary to manufacture extra touch control transmitting electrodes. Thus, manufacturing difficulty is reduced, and a smaller cell thickness is provided. Furthermore, in the present disclosure, raster electrodes reused as touch control transmitting electrodes are positioned on the outside of the 3D common electrode layer, not shielded by the 3D common electrode layer, and may well achieve the touch control detection.

BRIEF DESCRIPTION OF THE DRAWINGS

To describe technical solutions of embodiments of the present disclosure more clearly, the following will briefly introduce the accompanying drawings of the embodiments. It should be known that the accompanying drawings in the following description are merely associated with some embodiments of the present disclosure, but do not limit the present disclosure, in which.

DETAILED DESCRIPTION

To make technical solutions and advantages of embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person skilled in the art based on the embodiments of the present disclosure without creative efforts shall fall within the protection scope of the present disclosure.

Figure 1:
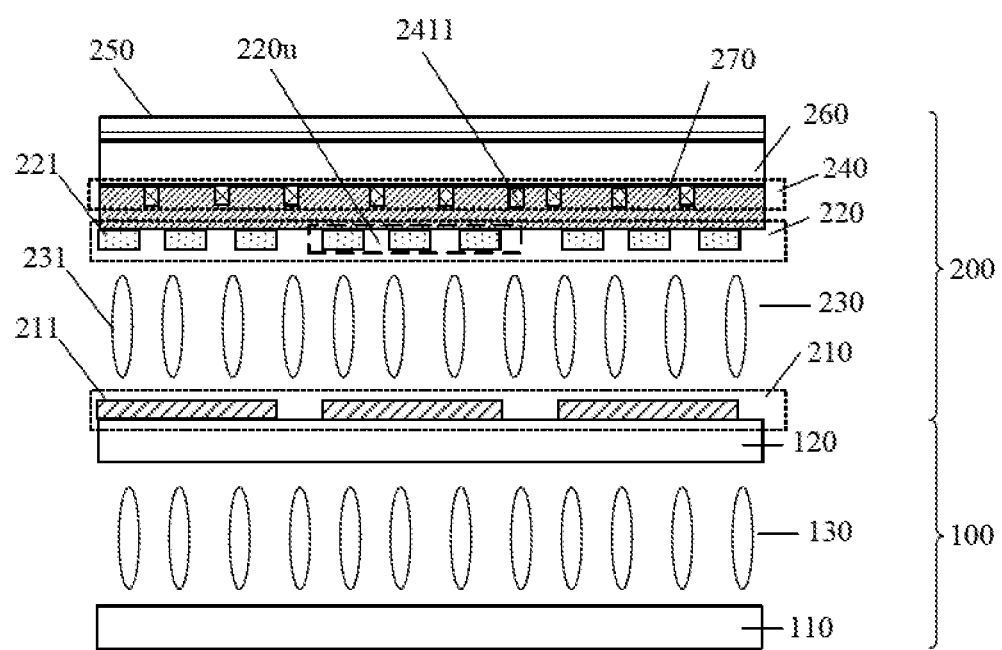
FIG. 1 is a schematic structural diagram of a display device according to an embodiment of the present disclosure.

FIG. 1 is a schematic structural diagram of a display device according to an embodiment of the present disclosure. As shown in FIG. 1, the display device in the embodiment includes a display panel 100 and a 3D raster module 200 disposed on a light emergent side of the display panel 100. The 3D raster 200 may be switched between 2D display and 3D display, and is also referred to as a variable 3D raster module in the following. The 3D raster module 200 includes a 3D common electrode layer 210, a 3D raster electrode layer 220 disposed on a light emergent side of the 3D common electrode layer 210, an electrically controlled material layer 230 disposed between the 3D common electrode layer 210 and the 3D raster electrode layer 220, and a touch control reception electrode layer 240 disposed on a light emergent side of the 3D raster electrode layer 220.

When an electric field is generated between the 3D raster electrode layer 220 and the 3D common electrode layer 210, the variable 3D raster module 200 is not transparent in locations of a display area corresponding to raster electrodes 221 but is transparent in other locations of the display area. In such a case, the variable 3D raster module 200 may function as a naked-eye 3D raster for achieving naked-eye 3D display. When no electric field is generated between the 3D raster electrode layer 220 and the 3D common electrode layer 210, the variable 3D raster module 200 is transparent in locations of the display area corresponding to the raster electrodes 221 and is also transparent in other locations of the display area. In such a case, the variable 3D raster module 200 is wholly transparent to allow the display device to provide 2D display. The raster electrodes 221 may be strip-shaped, and thus are also referred to as strip-shaped raster electrodes 221 hereinafter.

In the display device provided by the embodiments of the present disclosure, the strip-shaped raster electrodes 221 in the variable 3D raster module 200 may be reused as touch control transmitting electrodes, so that it is unnecessary to manufacture extra touch control transmitting electrodes. Thus, manufacturing difficulty is reduced, and a smaller cell thickness is provided. Furthermore, in the present disclosure, raster electrodes reused as touch control transmitting electrodes are positioned on the outside of the 3D common electrode layer, not shielded by the 3D common electrode layer, and may well achieve a touch control detection.

In the embodiment, the electrically controlled material in the electrically controlled material layer 230 specifically may be a liquid crystal material 231. In such a case, the foregoing variable 3D raster module 200 may further include a polarizer 250 disposed on a light emergent side of the strip-shaped raster electrodes 221. The liquid crystal material 231 is adapted to allow light rays emitted from the display panel 100 not to pass through the polarizer 250 in the case of the electric field, and to allow light rays emitted from the display panel 100 to pass through the polarizer 250 in the case of no electric field.

Specifically, alignment of liquid crystal molecules in the liquid crystal material 231 may be set so that long axes of liquid crystal molecules in the liquid crystal material 231 here are rotated to a particular direction in the electric field, and a polarization direction of light rays emitted from the display panel 100 after passing through liquid crystal molecules in the liquid crystal material 231 whose long axes are positioned in the particular direction is perpendicular to the polarization direction of the polarizer 250. Thus light rays are unable to pass through the polarizer 250. However, long axes of liquid crystal molecules in the liquid crystal material 231 not positioned in the electric field are not rotated, and accordingly light rays emitted from liquid crystal molecules and transmitted through the liquid crystal material 231 whose long axes are not rotated may pass through the polarizer 250. For 3D display, an electric field may be applied between the strip-shaped raster electrodes 221 in the 3D raster electrode layer 220 and common electrodes 211 of the 3D common electrode layer 210, non-transparent areas corresponding to the strip-shaped raster electrodes 221 and transparent areas corresponding to other areas are formed in the display area, and these transparent areas and non-transparent areas jointly constitute the naked-eye 3D raster required for naked-eye 3D display. When 2D display is needed, no electric field is generated between raster electrodes 221 of the 3D raster electrode layer 220 and common electrodes 211 of the 3D common electrode layer 210, so that both areas corresponding to the strip-shaped raster electrodes 221 and the other areas except the areas corresponding to the strip-shaped raster electrodes 221 in the display area are transparent, and thus 2D display may be achieved. The common electrodes 211 may be strip-shaped.

In the embodiment, the foregoing variable 3D raster module may also be in other structural forms. For example, material in the electrically controlled material layer 230 may be set as electrochromic material. The electrochromic material is not transparent when it is in an electric field but is transparent when it is not in the electric field. When 3D display is needed, an electric field may be applied between raster electrodes 221 in the 3D raster electrode layer 220 and common electrodes 211 in the 3D common electrode layer 210, so that the electrochromic material between the raster electrodes 221 and the common electrodes 211 is not transparent, and switching between 2D display and 3D display can also be achieved.

In the embodiment, the strip-shaped raster electrodes 221 are divided into a plurality of raster electrode groups 220u, and the raster electrode groups 220u may be strip-shaped and are also referred to as strip-shaped raster electrode groups 220u hereinafter. Each strip-shaped raster electrode group 220u may include a plurality of strip-shaped raster electrodes 221 (for example, in the figure, three strip-shaped raster electrodes are shown). The advantage is that the number of touch control transmitting electrode wires 222 to be manufactured may be reduced because a plurality of strip-shaped raster electrodes 221 are connected with the same touch control transmitting electrode wire 222. It is easy to understand that in order to ensure touch control accuracy, in practical application, the number of strip-shaped raster electrodes 221 comprised in each strip-shaped raster electrode group 220u shall not be too large. In addition, in practical application, each strip-shaped raster electrode group 220u may merely include one strip-shaped raster electrode 221, and corresponding technical solutions shall also fall within the protection scope of the present disclosure.

In the embodiment, merely a part of raster electrodes 221 in the 3D raster electrode layer 220 may be connected with the touch control transmitting electrode wires 222, and reused as touch control transmitting electrodes in this way. Alternatively, in practical application, all raster electrodes 221 in the 3D raster electrode layer 220 may be divided into a plurality of raster electrode groups 220u and separately connected with corresponding touch control transmitting electrode wires 222.

In the embodiment, the 3D common electrode layer 210 may include a plurality of common electrodes 211 and a plurality of 3D common electrode wires (not shown) connected with corresponding common electrodes. The strip-shaped raster electrode group 220u and the corresponding common electrode 211 constitute an electrode pair for generating an electric field.

Specifically, each common electrode 211 may be corresponding to one strip-shaped raster electrode group 220u in location and area, so as to correspond to each strip-shaped raster electrode 221 in this strip-shaped raster electrode group 220u.

Of course, in practical application, in addition to common electrodes 211 for working in pairs with the raster electrode groups 220, the foregoing 3D common electrode layer 210 further includes common electrodes 211 corresponding to raster electrodes 221 in addition to the strip-shaped raster electrode groups 220u in the 3D raster electrode layer 220 for working in pairs during 3D display.

Advantages of such an arrangement are as follows: while the voltage is applied to each strip-shaped raster electrode 221 in a strip-shaped raster electrode group 220u by means of touch control transmitting electrode wires 222, a touch control transmission signal is synchronously applied to the common electrode 211 corresponding to the strip-shaped raster electrode group 220u by means of a 3D common electrode wire, so that the voltage of each strip-shaped raster electrode 221 in the raster electrode group 220u is consistent with the voltage of a common electrode 211 in a corresponding location. In this way, signal delay caused by capacitance between a strip-shaped raster electrode 221 in this group and a corresponding common electrode 211 is reduced. Of course, in practical application, the foregoing common electrodes 211 are set as a whole plate, and corresponding technical solutions shall also fall within the protection scope of the present disclosure.

Figure 2:
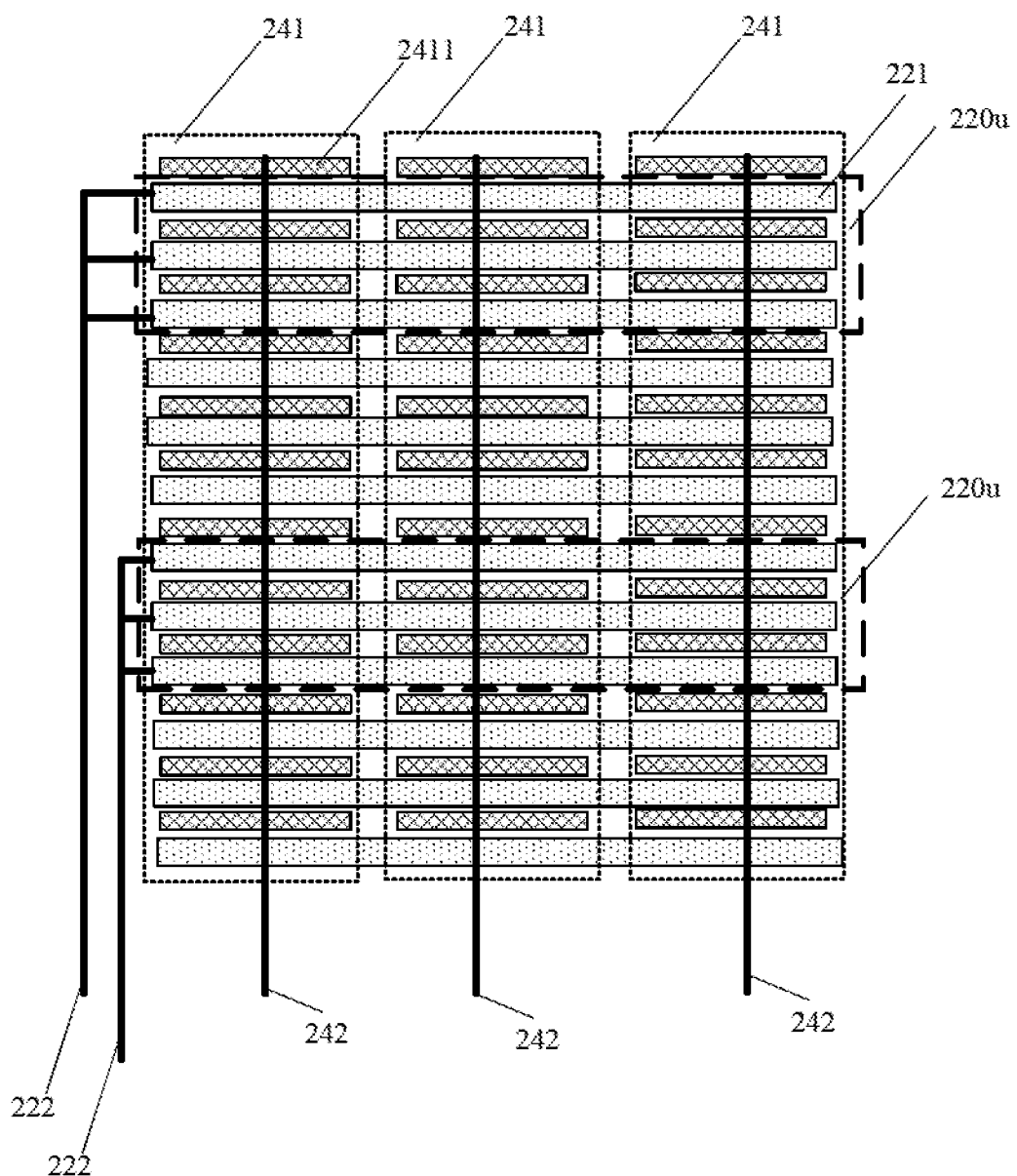
FIG. 2 is a schematic diagram for describing a partial structure of a variable 3D raster module 200 in the embodiment as shown in FIG. 1.

FIG. 2 is a schematic diagram for describing a partial structure of the variable 3D raster module 200 in the embodiment as shown in FIG. 1. As shown in FIG. 2, the 3D raster electrode layer 220 in the embodiment includes a plurality of strip-shaped raster electrode groups 220u and a plurality of touch control transmitting electrode wires 222. Each of the strip-shaped raster electrode groups 220u includes a plurality of strip-shaped raster electrodes 221. The strip-shaped raster electrodes 221 in each of the strip-shaped raster electrode groups 220u are connected with the same touch control transmitting electrode wire 222. The strip-shaped raster electrode groups 220u have functions of touch control transmission (Tx) electrodes.

The touch control reception (Rx) electrode layer 240 includes a plurality of reception electrodes 241 arranged in equal space and a plurality of touch control signal reception wires 242 connected with the reception electrodes 241. A length direction of each reception electrode 241 in the touch control reception electrode layer 240 is perpendicular to a length direction of each strip-shaped raster electrode 221 in the 3D raster electrode layer 220. The reception electrodes 241 may be strip-shaped, and thus are also referred to as strip-shaped reception electrodes 241 hereinafter.

In the embodiment, each strip-shaped reception electrode 241 here may include a plurality of reception sub-electrodes 2411 connected with the same touch control signal reception wire 242. Each reception sub-electrode 2411 is in parallel with each raster electrode 221 and is alternately arranged with each raster electrode 221. The reception sub-electrodes 2411 may be strip-shaped, and thus are also referred to as strip-shaped reception sub-electrodes 2411 hereinafter.

As shown in FIG. 2, the alternate arrangement here refers to a fact that no vertical overlap region exists between the strip-shaped reception sub-electrodes 2411 and the strip-shaped raster electrodes 221 in light emitting direction. In this way, capacitances between the strip-shaped reception sub-electrodes 2411 and the strip-shaped raster electrodes 221 can be reduced, thus reducing signal delay caused thereby. However, the foregoing strip-shaped reception electrode 241 may be designed as a whole plate of electrode (that is, there may be no space among a plurality of reception sub-electrodes 2411 of the reception electrode 241), and corresponding technical solutions shall also fall within the scope of protection of the present disclosure.

In specific implementation, as shown in FIG. 1, the foregoing variable raster module 200 further includes a transparent cover plate 260, and in such a case, the 3D raster electrode layer 220 and the touch control reception electrode layer 240 may be formed on the transparent cover plate 260 through a patterning process. By this means, the variable 3D raster module 200 may have a smaller cell thickness.

In addition, as shown in FIG. 1, a planarization insulation layer 270 may also be formed on a lower surface of the transparent cover plate 260. The planarization insulation layer 270 is disposed between the raster electrode layer 220 and the touch control reception electrode layer 240 for ease of manufacturing of the raster electrode layer 220. In another aspect, the touch control reception electrode layer 240 may be isolated from each strip-shaped raster electrode group 220u serving as the touch control transmitting electrode.

In practical application, the foregoing display panel 100 may be a liquid crystal display panel as shown in FIG. 1, and in such a case, the display panel includes a first substrate 110, a second substrate 120, and a liquid crystal material 130 disposed between the first substrate 110 and the second substrate 120. Apparently, the display panel 100 may also be a display panel of other patterns (such as an OLED display panel). Corresponding technical solutions can solve basic problems to be solved by the present disclosure, and the corresponding technical solutions shall also fall within the scope of protection of the present disclosure.

According to an embodiment of the present disclosure, there is further provided a method for driving a display device, which may be used for driving the display device in the foregoing embodiments. In the method of the embodiment, by controlling voltages applied to raster electrode wires and 3D common electrode wires, an electric field is generated between strip-shaped raster electrodes 221 and corresponding common electrodes 211 for 3D display. Touch control transmission signals are applied in sequence to each touch control transmitting electrode wire 222 to conduct a touch control detection.

In addition, the driving method in the embodiment may also drive the foregoing display device to achieve 2D display. In the driving method of the embodiment, by controlling the voltages applied to the raster electrode wires and the 3D common electrode wires, no electric field is generated between the strip-shaped raster electrodes 221 and the common electrodes 211 for 2D display. In addition, when the 3D common electrode layer 210 in the foregoing display device includes a plurality of common electrodes 211 corresponding to each raster electrode group 220u, by using the foregoing method, when a touch control transmission signal is applied to each touch control transmitting electrode wire 222, the touch control transmission signal may be synchronously applied to the 3D common electrode wire connected with the common electrode 211 corresponding to the strip-shaped raster electrode group 220u connected with the touch control transmitting electrode wire 222. In this way, the voltage of each strip-shaped raster electrode 221 in the raster electrode group 220u is consistent with the voltage of a common electrode 211 in a corresponding location, and thus signal delay caused by capacitance between the strip-shaped raster electrode 221 in the group and the corresponding common electrode 211 is reduced.

According to still another embodiment of the present disclosure, there is further provided a method for manufacturing a display device, the method may be used for manufacturing the foregoing display device and may include providing a display panel 100, and forming a 3D raster module 200 on a light emergent side of the display panel.

The variable 3D raster module 200 includes a 3D common electrode layer 210, a 3D raster electrode layer 220 disposed on a light emergent side of the 3D common electrode layer 210, an electrically controlled material layer 230 disposed between the 3D common electrode layer 210 and the 3D raster electrode layer 220, and a touch control reception electrode layer 240 disposed on a light emergent side of the 3D raster electrode layer 220. The variable 3D raster module 200 is configured to function as a 3D raster when an electric field is generated between the 3D common electrode layer 210 and the 3D raster electrode layer 220, and to be transparent when no electric field is generated between the 3D common electrode layer 210 and the 3D raster electrode layer 220. When the 3D raster module works as a 3D raster, the electrically controlled material in the electrically controlled material layer shields the light emitted from the display panel when the electrically controlled material is in the electric field. The light emitted from the display panel is transmitted when the electrically controlled material is not in the electric field. The 3D raster electrode layer 220 comprises a plurality of strip-shaped raster electrodes 221 arranged in equal space and a plurality of raster electrode wires. The plurality of strip-shaped raster electrodes 221 arranged in equal space are divided into a plurality of strip-shaped raster electrode groups 220u, and strip-shaped raster electrodes in one strip-shaped raster electrode group 220u are connected with the same touch control transmitting electrode wire 222 and are configured to function as a touch control transmitting electrode. The touch control reception electrode layer 240 includes a plurality of strip-shaped reception electrodes 241 and a plurality of touch control signal reception wires 242 connected with reception electrodes 241. A length direction of each strip-shaped reception electrode 241 in the touch control reception electrode layer is perpendicular to a length direction of each strip-shaped raster electrode 221 in the 3D raster electrode layer.

The abovementioned embodiments are merely the embodiments of the present disclosure, and the protection scope of the present disclosure is not limited to this. Any variation or substitution easily conceivable to a person skilled in the art within the technical scope disclosed in the present disclosure shall fall within the protection scope of the present disclosure. Therefore, the protection scope of the present disclosure shall be subject to the protection scope of the claims.

What is claimed is:
1. A display device comprising:
a display panel, and
a 3D raster module disposed on a light emergent side of the display panel, wherein the 3D raster module comprises a 3D common electrode layer, a 3D raster electrode layer disposed on a light emergent side of the 3D common electrode layer, an electrically controlled material layer disposed between the 3D common electrode layer and the 3D raster electrode layer, and a touch control reception electrode layer disposed on a light emergent side of the 3D raster electrode layer, wherein the 3D raster module is configured to function as a 3D raster when an electric field is generated between the 3D common electrode layer and the 3D raster electrode layer, and to be transparent when no electric field is generated between the 3D common electrode layer and the 3D raster electrode layer, wherein the 3D raster electrode layer comprises a plurality of raster electrodes each having a length and a width, and at least some of the plurality of raster electrodes are used as both raster electrodes and as touch control transmitting electrodes and each of the raster electrodes is connected with a touch control transmitting electrode wire, wherein the touch control reception electrode layer comprises a plurality of reception electrodes each having a length and a width and a plurality of touch control signal reception wires, and each of the reception electrodes is respectively connected with one of the touch control reception wires, and wherein a length direction of the reception electrodes in the touch control reception electrode layer is perpendicular to a length direction of the raster electrodes in the 3D raster electrode layer, wherein each reception electrode of the plurality of reception electrodes respectively comprises a plurality of reception sub-electrodes disposed along the length of each reception electrode, each reception sub-electrode having a length and a width, a length direction of each reception sub-electrode is in parallel with the length direction of the raster electrodes and is perpendicular with the length direction of the reception electrodes, and a plurality of reception sub-electrodes corresponding to a respective reception electrode are connected with a same respective touch control signal reception wire for the respective reception electrode, and the reception sub-electrodes are arranged alternately with the raster electrodes.

2. The display device according to claim 1, wherein an electrically controlled material constituting the electrically controlled material layer is a liquid crystal material, wherein the 3D raster module further comprises a polarizer disposed on the light emergent side of the 3D raster electrode layer, and wherein the liquid crystal material is adapted to prevent light rays emitted from the display panel from passing through the polarizer in the case of the electric field, and to allow the light rays emitted from the display panel to pass through the polarizer in the case of no electric field.

3. The display device according to claim 1, wherein the plurality of raster electrodes are divided into at least one raster electrode group, the raster electrode group comprises at least one raster electrode, and the at least one raster electrode in the raster electrode group is connected with a same touch control transmitting electrode wire.

4. The display device according to claim 3, wherein the 3D common electrode layer comprises a plurality of common electrodes and a plurality of 3D common electrode wires connected with the common electrodes, and wherein the raster electrode group and a corresponding common electrode constitute an electrode pair for generating an electric field.

5. The display device according to claim 1, wherein the 3D raster module further comprises a transparent cover plate, and wherein the 3D raster electrode layer and the touch control reception electrode layer are formed on the transparent cover plate through a patterning process.

6. A method for driving the display device according to claim 1 comprising:
generating an electric field between raster electrodes and common electrodes for 3D display, by controlling voltages applied to raster electrode wires and 3D common electrode wires, and
applying touch control transmission signals in sequence to each touch control transmitting electrode wire to conduct a touch control detection.

7. The method according to claim 6 further comprising:
for each of the touch control transmitting electrode wires, applying the touch control transmission signal to a 3D common electrode wire connected with a common electrode corresponding to a raster electrode group connected with a touch control transmitting electrode wire, at the same time when the touch control transmission signal is applied to the touch control transmitting electrode wire.

8. The method according to claim 6 further comprising:
generating no electric field between the raster electrodes and the common electrodes for 2D display, by controlling the voltages applied to the raster electrode wires and the 3D common electrode wires.

9. The method according to claim 6, wherein an electrically controlled material constituting the electrically controlled material layer is a liquid crystal material, wherein the 3D raster module further comprises a polarizer disposed on the light emergent side of the 3D raster electrode layer, wherein the liquid crystal material is adapted to prevent light rays emitted from the display panel from passing through the polarizer in the case of the electric field, and to allow the light rays emitted from the display panel to pass through the polarizer in the case of no electric field.

10. The method according to claim 6, wherein the plurality of raster electrodes are divided into at least one raster electrode group, the raster electrode group comprises at least one raster electrode, and the at least one raster electrode in the raster electrode group is connected with a same touch control transmitting electrode wire.

11. The method according to claim 10, wherein the 3D common electrode layer comprises a plurality of common electrodes and a plurality of 3D common electrode wires connected with the common electrodes, and wherein the raster electrode group and the corresponding common electrode constitute an electrode pair for generating an electric field.

12. The method according to claim 6, wherein the 3D raster module further comprises a transparent cover plate, and wherein the 3D raster electrode layer and the touch control reception electrode layer are formed on the transparent cover plate through a patterning process.

13. A method for manufacturing a display device comprising:
providing a display panel, and
forming a 3D raster module on a light emergent side of the display panel,
wherein the 3D raster module comprises a 3D common electrode layer, a 3D raster electrode layer disposed on a light emergent side of the 3D common electrode layer, an electrically controlled material layer disposed between the 3D common electrode layer and the 3D raster electrode layer, and a touch control reception electrode layer disposed on a light emergent side of the 3D raster electrode layer, wherein the 3D raster module is configured to function as a 3D raster when an electric field is generated between the 3D common electrode layer and the 3D raster electrode layer, and to be transparent when no electric field is generated between the 3D common electrode layer and the 3D raster electrode layer, wherein the 3D raster electrode layer comprises a plurality of raster electrodes each having a length and a width, and at least some of the plurality of raster electrodes are used as both raster electrodes and as touch control transmitting electrodes and each of the raster electrodes is connected with a touch control transmitting electrode wire, wherein the touch control reception electrode layer comprises a plurality of reception electrodes each having a length and a width and a plurality of touch control signal reception wires, and each of the reception electrodes is respectively connected with one of the touch control reception wires, and a length direction of the reception electrodes in the touch control reception electrode layer is perpendicular to a length direction of the raster electrodes in the 3D raster electrode layer, wherein each reception electrode of the plurality of reception electrodes respectively comprises a plurality of reception sub-electrodes disposed along the length of each reception electrode, each reception sub-electrode having a length and a width, a length direction of each reception sub-electrode is in parallel with the length direction of the raster electrodes and is perpendicular with the length direction of the reception electrodes, and a plurality of reception sub-electrodes corresponding to a respective reception electrode are connected with a same respective touch control signal reception wire for the respective reception electrode, and the reception sub-electrodes are arranged alternately with the raster electrodes.

14. The method according to claim 13, wherein an electrically controlled material constituting the electrically controlled material layer is a liquid crystal material, wherein the 3D raster module further comprises a polarizer disposed on the light emergent side of the 3D raster electrode layer, wherein the liquid crystal material is adapted to prevent light rays emitted from the display panel from passing through the polarizer in the case of the electric field, and to allow the light rays emitted from the display panel to pass through the polarizer in the case of no electric field.

15. The method according to claim 13, wherein the plurality of raster electrodes are divided into at least one raster electrode group, the raster electrode group comprises at least one raster electrode, and the at least one raster electrode in the raster electrode group is connected with a same touch control transmitting electrode wire.

16. The method according to claim 15, wherein the 3D common electrode layer comprises a plurality of common electrodes and a plurality of 3D common electrode wires connected with the common electrodes, and wherein the raster electrode group and a corresponding common electrode constitute an electrode pair for generating an electric field.

17. The method according to claim 13, wherein the 3D raster module further comprises a transparent cover plate, and wherein the 3D raster electrode layer and the touch control reception electrode layer are formed on the transparent cover plate through a patterning process.

* * * * *